(12) United States Patent  (10) Patent No.: US 8,155,854 B2
Osaki et al.  (45) Date of Patent: Apr. 10, 2012

(54) VEHICLE AUTOMATIC OPERATION CONTROL DEVICE

(75) Inventors: Shintaro Osaki, Nisshin (JP); Hiroyuki Kodama, Kariya (JP); Masayoshi Takeda, Kariya (JP); Kazunori Kadowaki, Nagoya (JP); Syotarou Fukuda, Obu (JP); Hajime Kumabe, Kariya (JP); Yasuhiro Nakai, Kariya (JP); Satoshi Niwa, Nagoya (JP)

(73) Assignees: Advics Co., Ltd., Kariya, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 848 days.

(21) Appl. No.: 12/211,644

(22) Filed: Sep. 16, 2008

(65) Prior Publication Data
US 2009/0076699 A1 Mar. 19, 2009

(30) Foreign Application Priority Data
Sep. 18, 2007 (JP) .................................. 2007-240892

(51) Int. Cl.
*B60T 8/28* (2006.01)
(52) U.S. Cl. ........................................................ 701/78
(58) Field of Classification Search .............. 701/69–71, 701/78–82; 303/142–143
See application file for complete search history.

(56) References Cited

U.S. PATENT DOCUMENTS
5,400,865 A 3/1995 Togai et al.

2001/0056320 A1 12/2001 Kato et al.
2005/0278104 A1* 12/2005 Masuda et al. ................... 701/69

FOREIGN PATENT DOCUMENTS
JP 62-244724 A 10/1987
JP 2-201038 A 8/1990
JP 06-001229 1/1994
JP 2002-5277 A 1/2002
JP 2005-170194 A 6/2005

OTHER PUBLICATIONS

Partial English-language translation of Japanese Office Action issued Sep. 15, 2011 in the corresponding Japanese Patent Application No. 2007-240892.

* cited by examiner

*Primary Examiner* — Yonel Beaulieu
(74) *Attorney, Agent, or Firm* — Buchanan Ingersoll & Rooney PC

(57) ABSTRACT

A vehicle automatic operation control device includes a target required torque calculating part (31) which determines the target required torque from the respective calculated values of a feed-forward calculated value and a feedback calculated value, and an automatic operation control part D which causes the vehicle to operate automatically on the basis of the determined target required torque, and which performs slip suppression control that suppresses slip of the wheels when any of the wheels of the vehicle slip. In cases where slip suppression control is performed by the automatic operation control part (D), the target required torque calculating part (31) holds the feedback calculated value based on the deviation between the target acceleration and actual acceleration, and determines the target required torque from the respective calculated values of the held feedback calculated value and feed-forward calculated value.

6 Claims, 7 Drawing Sheets

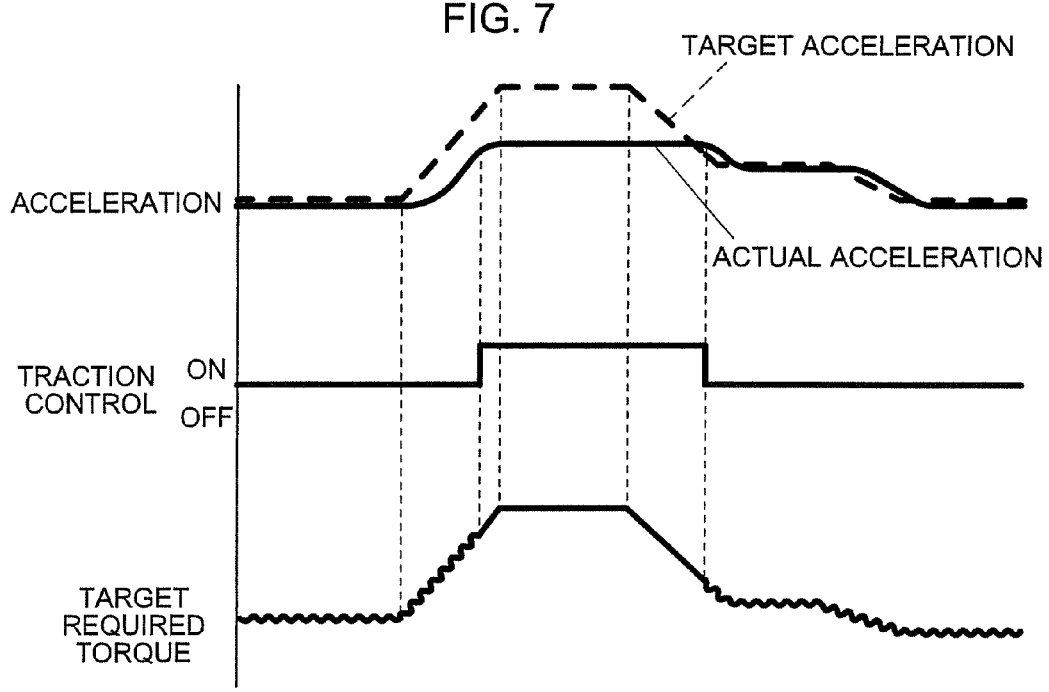
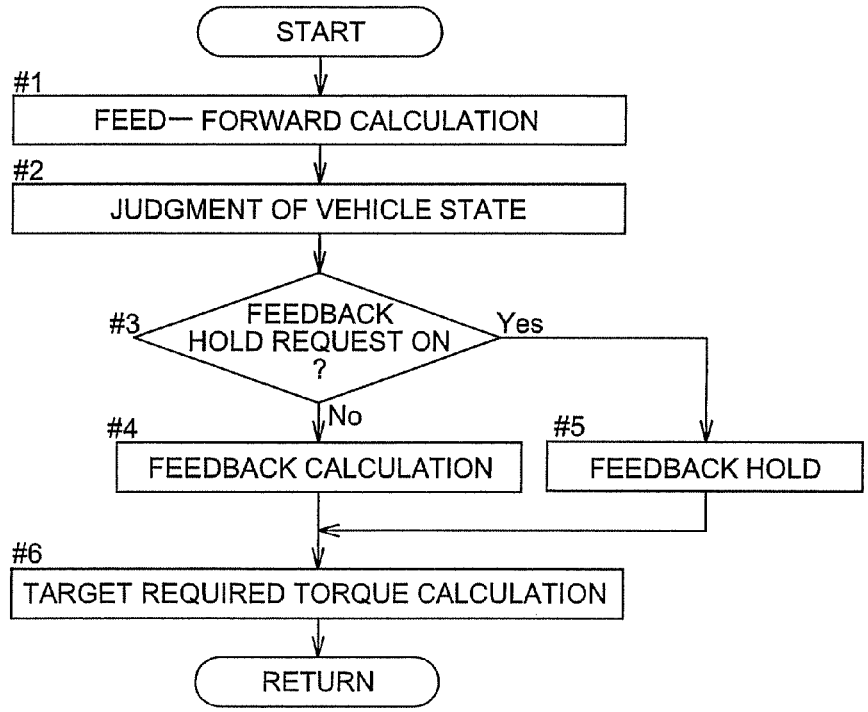

VEHICLE AUTOMATIC OPERATION CONTROL DEVICE

BACKGROUND OF THE INVENTION

1. Field of the Invention

The present invention relates to a vehicle automatic operation control device comprising a target required torque calculating part which determines the target required torque from the respective calculated values according to the feed-forward calculated value based on the target acceleration and the feedback calculated value based on the deviation between the target acceleration and the actual acceleration, and an automatic operation control part which causes automatic operation of the vehicle on the basis of the determined target required torque.

2. Description of the Related Art

In the above vehicle automatic operation control device, a feed-forward calculated value is determined on the basis of the target acceleration by feed-forward calculations, and the feedback calculated value is determined on the basis of the deviation between the target acceleration and actual acceleration by feedback calculations. Furthermore, the target required torque is determined from the respective calculated values of the feed-forward calculated value and feedback calculated value, and the vehicle is automatically operated by repeating in real time an operation that applies this target required torque to the vehicle. Here, the target required torque refers to the braking torque that is applied to the wheels during deceleration, or the driving torque that is applied to the drive wheels during acceleration.

In the automatic operation control, for example, when the vehicle is automatically operated on a road surface with a low coefficient of friction, the target required torque may become excessively large and the wheels may slip if the target acceleration is large. Accordingly, the automatic operation control part performs slip suppression control, and a slip suppressing torque is applied to the vehicle. Types of slip suppression control include ABS control that suppresses slip of the wheels during deceleration of the vehicle, and traction control that suppresses slip of the wheels during acceleration of the vehicle.

During automatic operation, a slip suppressing torque is applied to the vehicle with preference over the target required torque when slip suppression control is performed. For example, a slip suppressing torque is preferentially applied to the vehicle by disposing the location where the slip suppressing torque is applied by ABS control downstream from the location where the target required torque is applied.

Thus, during the performance of slip suppression control, the target required torque is not applied to the vehicle, and the actual acceleration cannot track the target acceleration. For this reason, a large deviation is generated between the target acceleration and actual acceleration, and the feedback calculated value becomes excessive. On the other hand, slip of the wheels does not occur, and when the slip suppression control is completed, the target required torque determined from the respective calculated values of the feed-forward calculated value and feedback calculated value is applied to the vehicle. Accordingly, when the target required torque is determined from the respective calculated values of the feed-forward calculated value and feedback calculated value during the performance of slip suppression control, an excessive target required torque is applied to the vehicle when the slip suppression control is completed; an abrupt acceleration and abrupt deceleration are therefore generated, and the operating state of the vehicle becomes unstable.

Accordingly, conventional vehicle automatic operation control devices include devices which are devised so that when, for example, ABS control is performed as slip suppression control, the target required torque calculating part maintains the target required torque at a constant value. In this technique, when the slip suppression control is completed, the target required torque maintained at a constant value is applied to the vehicle; accordingly, there is no application of an excessively large target required torque to the vehicle, and the operating state of the vehicle can be prevented from becoming unstable (for example, see Patent Document 1).

[Patent Document 1] JP (Kokai) 6-1229

SUMMARY OF THE INVENTION

FIG. 10 shows the target acceleration, actual acceleration, ABS control ON/OFF, and target required torque in a conventional vehicle automatic operation control device.

When ABS control is performed, the torque required in order to suppress slipping of the wheels is applied to the vehicle; accordingly, the actual acceleration is a constant acceleration which is such that no slipping of the wheels is generated on the road surface. Consequently, when ABS control is performed, the actual acceleration cannot track the target acceleration.

The target required torque is maintained at a constant value during the performance of ABS control regardless of any variations in the target acceleration. Consequently, even in cases where there is a variation such that the target acceleration becomes smaller, resulting in a small acceleration which is such that ABS control is not performed, the target required torque is maintained at a constant value. Accordingly, when ABS control is performed, this ABS control cannot easily be completed, and a state continues in which the actual acceleration cannot track the target acceleration.

Furthermore, for example, in cases where slip of the wheels is suppressed so that a large deviation is generated between the actual acceleration and target acceleration even if ABS control is completed by an external disturbance such as variation in the coefficient of friction of the road surface or the like, a long time is required before the actual acceleration can track the target acceleration.

The present invention was devised in the light of such points; it is an object of the present invention to provide a vehicle automatic operation control device which can automatically operate the vehicle while the actual acceleration tracks the target acceleration in a favorable manner.

In order to achieve the aforesaid object, a vehicle automatic operation control device according to a first aspect of the present invention is a vehicle automatic operation control device comprising a target required torque calculating part for determining a target required torque from each calculated value according to a feed-forward calculated value based on a target acceleration and a feedback calculated value based on a deviation between the target acceleration and an actual acceleration; and an automatic operation control part for causing automatic operation of a vehicle on the basis of the determined target required torque, and performing slip suppression control for suppressing slip of a vehicle wheel in cases where any of the wheels of the vehicle slips; wherein in a case where slip suppression control is performed by the automatic operation control part, the target required torque calculating part holds the feedback calculated value based on the deviation between the target acceleration and the actual acceleration, and determines the target required torque from each of the calculated values according to the held feedback calculated value and the feed-forward calculated value.

According to the device of the first aspect, the feedback calculated value is held during the performance of slip suppression control, the target required torque is determined from the respective calculated values according to the held feedback calculated value and feed-forward calculated value, and the target required torque is varied in accordance with the target acceleration. For example, as the target acceleration decreases, the target required torque also decreases. Accordingly, the target required torque itself decreases to the point where slip does not occur in the wheels, and slip suppression control can be completed. Thus, if a device of this construction is used, slip suppression control can be quickly completed, and a state in which the actual acceleration cannot track the target acceleration can easily be avoided. Furthermore, when slip suppression control is completed, the target required torque determined from the respective calculated values according to the held feedback calculated value and feed-forward calculated value can be applied to the vehicle. Accordingly, when slip suppression control is completed, the deviation between the actual acceleration and target acceleration can be reduced, and the actual acceleration can be caused to agree with the target acceleration in a short time.

As a result of having the above construction, the control device of this aspect makes it possible for the actual acceleration to track the target acceleration in a favorable manner, and stable automatic operation of the vehicle can be realized.

According to a vehicle automatic operation control device of a second aspect of the present invention, the automatic operation control part suppresses wheel slip during deceleration of the vehicle as the slip suppression control; and the target required torque calculating part determines braking torque applied to the wheels as the target required torque.

According to the invention of the second aspect, slip of the wheels during deceleration can be suppressed in the automatic operation of the vehicle by applying the braking torque as the target required torque to the wheels. Furthermore, when the vehicle is decelerated, the vehicle can be automatically operated while causing the actual acceleration to track the target acceleration in a favorable manner.

According to a vehicle automatic operation control device of a third aspect of the present invention, the automatic operation control part suppresses the slip of drive wheels during acceleration of the vehicle as the slip suppression control; and the target required torque calculating part determines drive torque applied to the drive wheels as the target required torque.

According to this aspect, slip of the wheels during acceleration in the automatic operation of the vehicle can be suppressed by applying the driving torque to the drive wheels as the target required torque. Furthermore, when the vehicle is accelerated, the vehicle can be automatically operated while causing the actual acceleration tracks the target acceleration in a favorable manner.

According to a vehicle automatic operation control device of a fourth aspect of the present invention, when the slip suppression control performed by the automatic operation control part has concluded, the target required torque calculating part restarts feedback calculations on the basis of the held feedback calculated value.

In this construction, when the slip suppression control performed by the automatic operation control part is completed, the target required torque determined from the respective calculated values according to the held feedback calculated value and feed-forward calculate value can be applied to the vehicle. Thus, since the target required torque calculating part restarts the feedback calculations on the basis of the held feedback calculated value, even in cases where the actual acceleration varies due to external disturbances or the like, the target required torque can be determined in a state in which such variation caused by these external disturbances or the like is taken into consideration. Accordingly, the torque necessary for automatic operation can be suitably applied, and stable automatic operation can be performed.

BRIEF DESCRIPTION OF THE DRAWINGS

FIG. 7 is a timing chart showing the acceleration, traction control ON/OFF, and target required torque when traction control is performed during acceleration in automatic operation;
FIG. 8 is a flow chart showing the operation that calculates the target required torque.

DESCRIPTION OF THE PREFERRED EMBODIMENTS

An embodiment of the vehicle automatic operation control device of the present invention will be described below.

<Outline of the Present Invention>

In the vehicle automatic operation control device of the present invention, automatic operation control which automatically operates the vehicle is performed by repeating in real time an operation that applies the target required torque determined from the respective calculated values of the feed-forward calculated value and feedback calculated value to the vehicle. In this automatic operation control, the feedback calculated value is held when slip suppression control that suppresses the slip of the wheels is performed, the target required torque is determined from the respective calculated values of the held feedback calculated value and feed-forward calculated value, and the target required torque is varied in accordance with the target acceleration, so that the tracking of the target acceleration by the actual acceleration can be performed in a favorable manner.

A vehicle equipped with the vehicle automatic operation control device of the present invention will be described below.

<Schematic Construction of the Vehicle>

Figure 1:
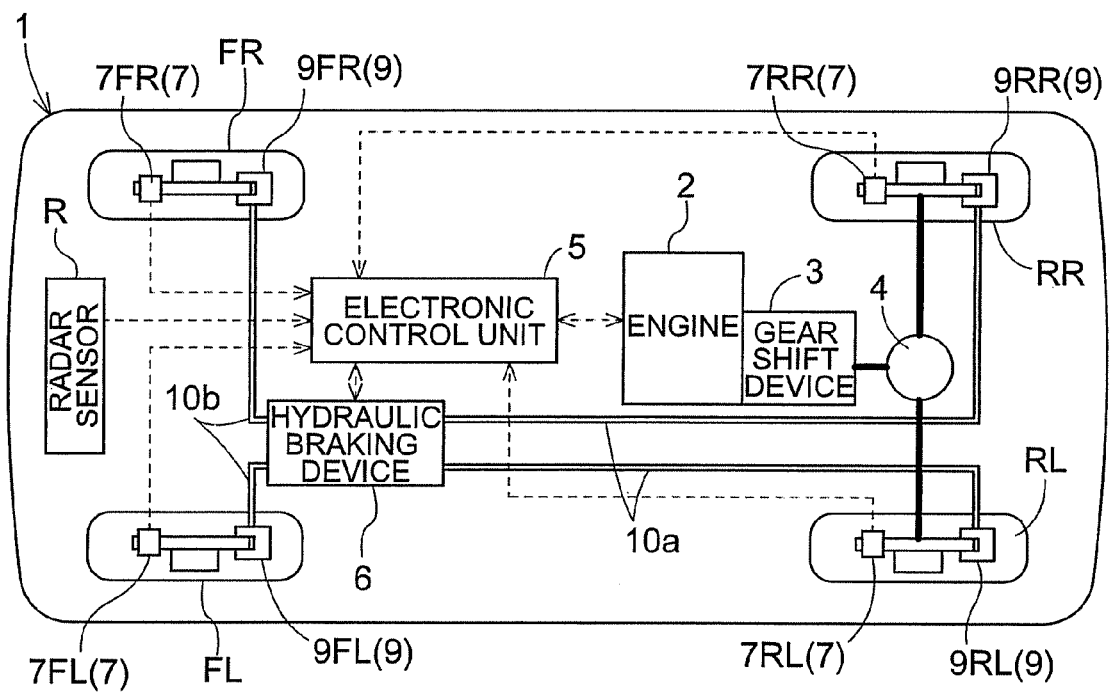
FIG. 1 is a schematic structural diagram of a vehicle.

As is shown in FIG. 1, a vehicle 1 comprises four wheels FR, FL, RR, and RL, an engine 2, a gear shift device 3, a differential device 4, an electronic control unit 5, and a hydraulic braking device 6. The vehicle automatic operation control device of the present invention corresponds to the electronic control unit 5.

This vehicle 1 has a rear wheel drive type construction in which the output force of the engine 2 is transmitted to the right rear wheel RR and left rear wheel RL via the gear shift device 3 and differential device 4. A rear wheel drive system is shown for example as the drive system of the vehicle 1; however, a front wheel drive system in which the right front wheel FR and left front wheel FL are driven, or a four wheel drive system in which all four of the wheels are driven, may also be used.

Wheel speed sensors 7 which detect the speeds of the respective wheels are disposed on the vehicle 1. The wheel speed sensors 7 are constructed from a wheel speed sensor 7FR corresponding to the right front wheel FR, a wheel speed sensor 7FL corresponding to the left front wheel FL, a wheel speed sensor 7RR corresponding to the right rear wheel RR, and a wheel speed sensor 7RL corresponding to the left rear wheel RL. The speeds of the respective wheels can be separately detected by the respective wheel speed sensors 7. Furthermore, a radar sensor R which is used to detect the inter-vehicle distance between the vehicle 1 and a preceding vehicle is disposed on the vehicle 1.

<Construction of Hydraulic Braking Device>

Figure 2:
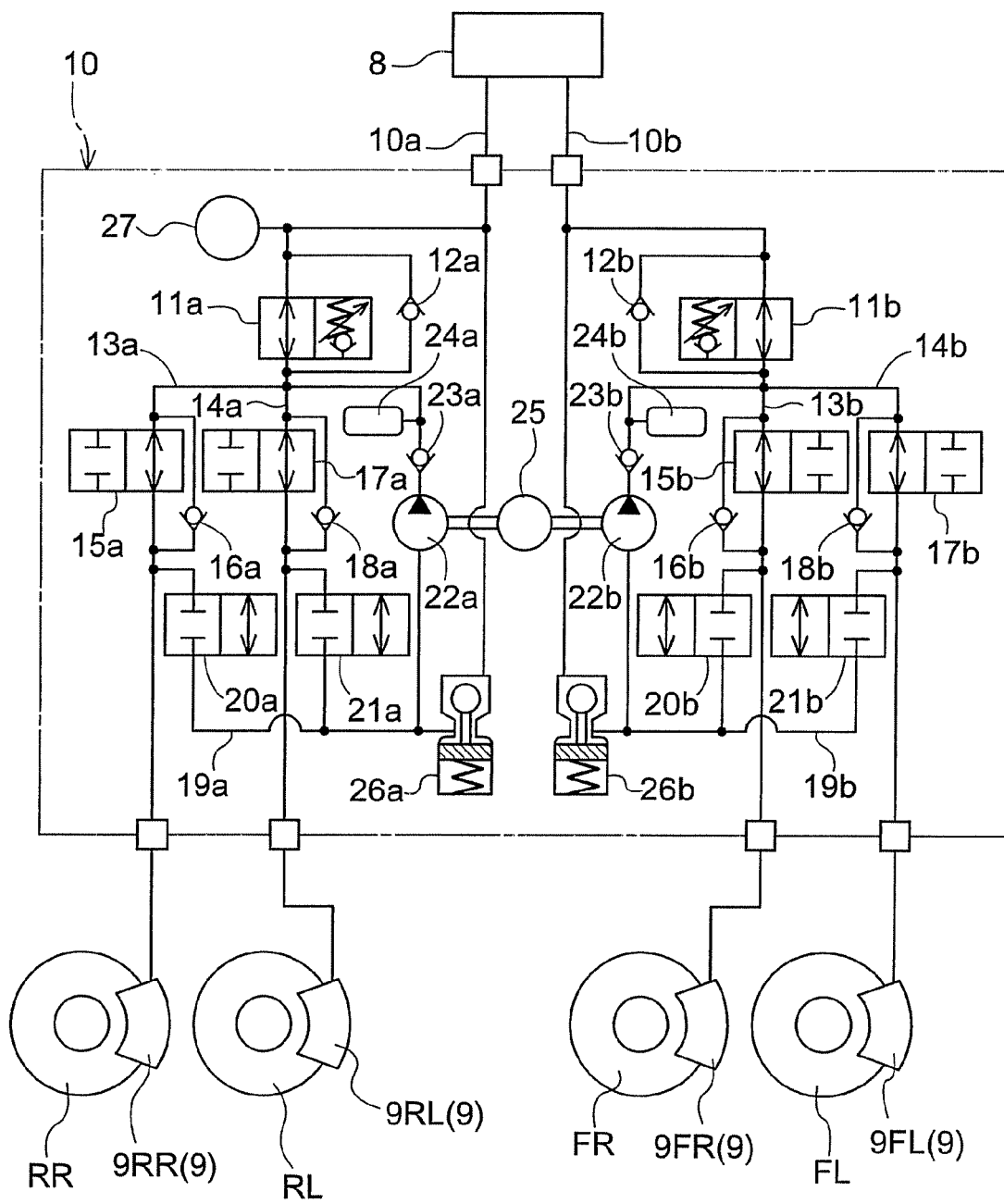
FIG. 2 is a structural diagram of a hydraulic brake device.

The hydraulic braking device 6 will be described with reference to FIG. 2.

The hydraulic braking device 6 has a master cylinder 8 in which a master cylinder fluid pressure is generated in accordance with the brake operating force applied by the operator, and a fluid pressure circuit 10 which applies the master cylinder fluid pressure to the wheel cylinders 9 of the respective wheels FR, FL, RR, and RL. The wheel cylinders 9FR, 9FL, 9RR, and 9RL are disposed on the respective wheels.

The master cylinder 8 is a tandem cylinder in which two fluid pressure chambers not shown in the drawings are installed. In this master cylinder 8, the master cylinder fluid pressure is generated by a force obtained by amplifying the brake operating force by a force multiplying device not shown in the drawings. Furthermore, a master reservoir not shown in the drawings which supplies a brake fluid to the master cylinder 8, and stores the excess brake fluid of the master cylinder 8, is provided.

The fluid pressure circuit 10 is constructed from a first fluid pressure circuit 10a that communicates between one of the fluid pressure chambers of the master cylinder 8 and the wheel cylinder 9RR of the right rear wheel RR and wheel cylinder 9RL of the left rear wheel RL, and a second fluid pressure circuit 10b that communicates between the other fluid pressure chamber of the master cylinder 8 and the wheel cylinder 9FR of the right front wheel FR and wheel cylinder 9FL of the left front wheel FL.

A linear control valve 11a that can alter the state of communication is installed in the first fluid pressure circuit 10a. A master check valve 12a which allows the flow of brake fluid from the master cylinder 8 to the wheel cylinders 9, but which prevents flow in the opposite direction, is installed in parallel with the linear control valve 11a. Even if the linear control valve 11a is in a blocking state, the master check valve 12a allows the flow of brake fluid from the master cylinder 8 to the wheel cylinders 9, and applies the master cylinder fluid pressure to the wheel cylinders 9.

The first fluid pressure circuit 10a branches into a first branching path 13a and second branching path 14a at a point past the linear control valve 11a toward the wheel cylinder 9. The first branching path 13a and second branching path 14a are respectively connected to the wheel cylinders 9RR and 9RL. A first ordinarily-open control valve 15a which can be switched between two positions, i.e., a communicating position and a blocking position, is installed in the first branching path 13a. A first check valve 16a which allows the flow of brake fluid from the wheel cylinders 9 to the master cylinder 8, but which prevents flow in the opposite direction, is installed in parallel with the first ordinarily-open control valve 15a. A second ordinarily-open control valve 17a and a second check valve 18a are installed in the second branching path 14a in the same manner as in the first branching path 13a.

The flow path portion of the first branching path 13a branching off at a point past the first ordinarily-open control valve 15a toward the wheel cylinder 9, and the flow path portion of the second branching path 14a branching off at a point past the second ordinarily-open control valve 17a toward the wheel cylinder 9 flow together in a branch-confluent path 19a. In the branch-confluent path 19a, a first ordinarily-closed control valve 20a which can be switched between two positions, i.e., a communicating position and a blocking position, is installed in the flow path portion that is branched from the first branching path 13a. Furthermore, a second ordinarily-closed control valve 21a which can be switched between two positions, i.e., a communicating position and a blocking position, is installed in the flow path portion that is branched from the second branching path 14a. A fluid pressure pump 22a, third check valve 23a, and damper 24a are installed in that order in the confluent portion of the branch-confluent path 19a. The confluent portion of the branch-confluent path 19a is connected between the linear control valve 11a, and the first ordinarily-open control valve 15a and second ordinarily-open control valve 17a in the first fluid pressure circuit 10a. The fluid pressure pump 22a is rotationally driven by a motor 25, and is constructed so that the brake fluid is pressurized to a specified pressure and discharged In the branch-confluent path 19a, a reservoir 26a is installed between the first ordinarily-closed control valve 20a and second ordinarily-closed control valve 21a, and the fluid pressure pump 22a. The reservoir 26a is connected between the master cylinder 8 and linear control valve 11a in the first fluid pressure circuit 10a.

The construction of the first fluid pressure circuit 10a in the fluid pressure circuit 10 was described above. The first fluid pressure circuit 10a and second fluid pressure circuit 10b have a similar construction, and members similar to those of the first fluid pressure circuit 10a are also installed in the second fluid pressure circuit 10b. In other words, respective members such as a linear control valve 11b, first ordinarily-open control valve 15b, second ordinarily-open control valve 17b, first ordinarily-closed control valve 20b, second ordinarily-closed control valve 21b, fluid pressure pump 22b, and the like are also installed in the second fluid pressure circuit 10b. For the same members, "a" is appended to the identifying number in the case of members installed in the first fluid pressure circuit 10a, and "b" is appended to the identifying numbers in the case of members installed in the second fluid pressure circuit 10b.

Below, in cases where both members installed in the first fluid pressure circuit 10a and members installed in the second fluid pressure circuit 10b are indicated, "a" and "b" following the identifying numbers are omitted.

In regard to the motor 25, the system is constructed so that the fluid pressure pump 22a installed in the first fluid pressure circuit 10a and the fluid pressure pump 22b installed in the second fluid pressure circuit 10b are driven by a single motor 25.

A fluid pressure sensor 27 which detects the master cylinder fluid pressure is provided. In this embodiment, the fluid pressure sensor 27 is installed in the first fluid pressure circuit 10a; however, it would also be possible to install this sensor in the second fluid pressure circuit 10b.

<Control Construction of Vehicle>

Figure 3:
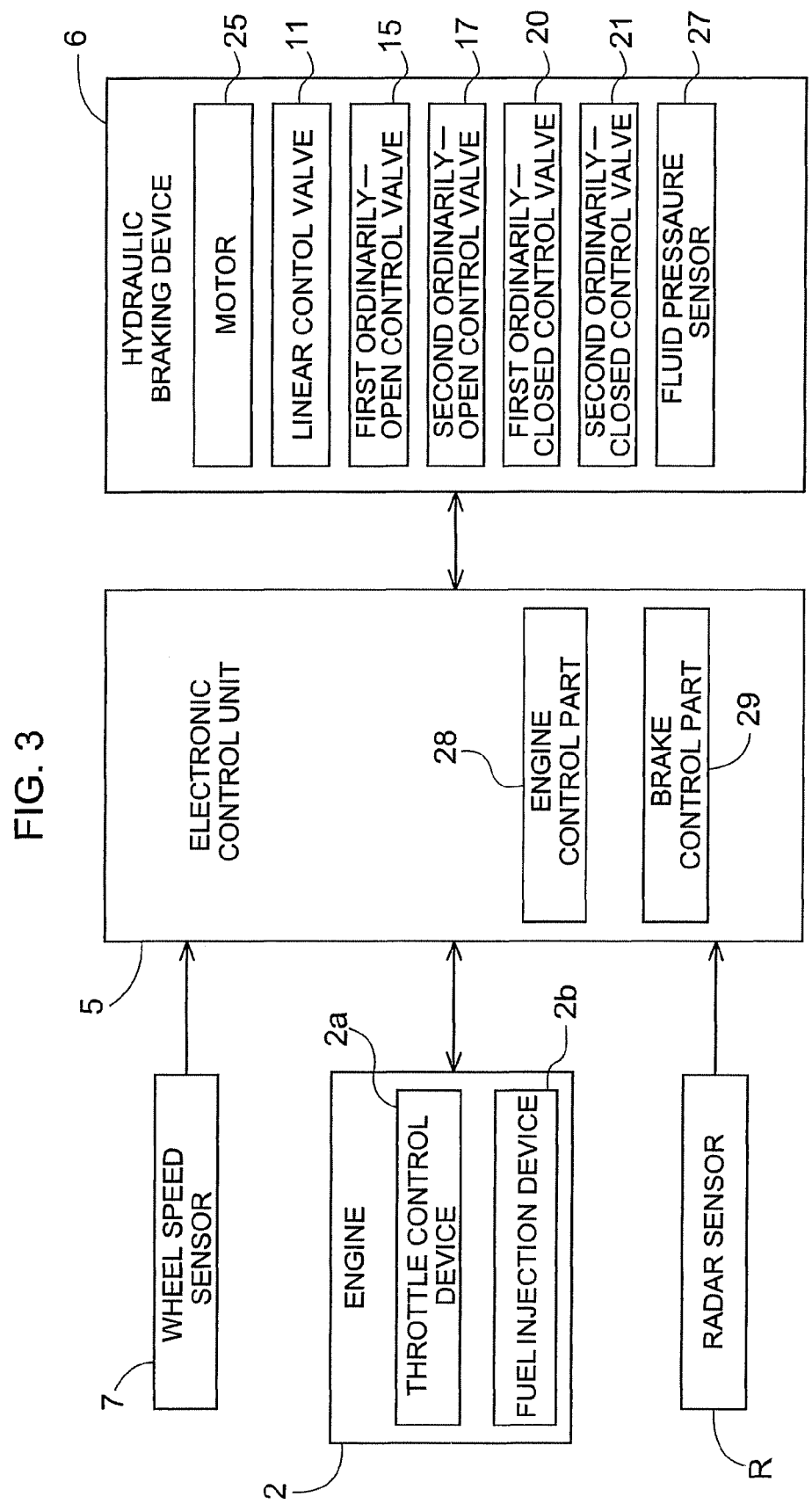
FIG. 3 is a control block diagram of the vehicle.

The control construction of the vehicle will be described with reference to FIG. 3.

The electronic control unit 5 is constructed from a microcomputer equipped with CPU, ROM, RAM, and input-output part. The system is constructed so that the detection signals from the various types of sensors such as the respective wheel speed sensors 7, radar sensor R, fluid pressure sensor 27, and the like are input into the electronic control unit 5. The electronic control unit 5 comprises an engine control part 28 which controls the operation of the engine 2, and a brake control part 29 which controls the operation of the hydraulic braking device 6. The engine control part 28 determines the amount of fuel injection, the degree of throttle opening required in order to output the driving torque determined by the accelerator operation of the vehicle operator, and the like, and controls the operation of a throttle control device 2a and fuel injection device 2b installed in the engine 2. The throttle control device 2 controls the degree of throttle opening of the engine 2. The fuel injection device 2b controls the amount of fuel injection of the engine 2.

The brake control part 29 automatically controls the operation of the hydraulic braking device 6 so that a braking torque is applied to the respective wheels regardless of the braking operation performed by the vehicle operator. The brake control part 29 controls the respective operations of the linear control valves 11, first ordinarily-open control valves 15, second ordinarily-open control valves 17, first ordinarily-closed control valves 20, second ordinarily-closed control valves 21, and motor 25 so that a braking torque can be separately applied to the respective wheels.

For example, returning to FIG. 2, a case will be described in which a braking torque is applied to the right rear wheel RR.

When the wheel cylinder pressure is to be increased, the brake control part 29 causes the motor 25 to operate, places the linear control valve 11a in a blocking state, places the first ordinarily-open control valve 15a in the communicating position, and places the first ordinarily-closed control valve 20a in the blocking position. When the wheel cylinder pressure is to be held, the brake control part 29 places the linear control valve 11b in a blocking state, places the first ordinarily-open control valve 15a to the blocking position, and places the first ordinarily-closed control valve 20a in the blocking position. When the wheel cylinder pressure is to be reduced, the brake control part 29 places the linear control valve 11a in a blocking state, places the first ordinarily-open control valve 15a to the blocking position, and places the first ordinarily-closed control valve 20a to the communicating position.

<ABS Control>

The brake control part 29 performs ABS control that suppresses slip of the wheels during deceleration of the vehicle 1. In a state in which the fluid pressure pumps 22 are operated by the motor 25, and the linear control valves 11 are placed in a blocking state, the operation of the first ordinarily-open control valves 15 or second ordinarily-open control valves 17, and of the first ordinarily-closed control valves 20 or second ordinarily-closed control valves 21, is controlled, and a switch is made to the increase, decrease, or holding of the wheel cylinder pressure, so that the braking torque applied to the wheels is controlled. Thus, the brake control part 29 controls the braking torque applied to the wheels showing deceleration slip, and deceleration slip is suppressed by applying a slip suppressing torque used to suppress the slip of the wheels to the vehicle 1.

The brake control part 29 compares the vehicle speed and the wheel speed according to the wheel speed sensors 7, and in cases where the deceleration slip rate of the wheels is greater than the set value for deceleration slip, the brake control part 29 judges that the wheels are undergoing deceleration slip, and performs ABS control. The brake control part 29 compares the vehicle speed and the wheel speed according to the wheel speed sensors 7, and ends ABS control if the deceleration slip rate of the wheels is smaller than the set value for ending ABS.

<Traction Control>

The engine control part 28 performs traction control that suppresses slip of the wheels during acceleration of the vehicle 1. The engine control part 28 performs driving torque reduction calculations in which the driving torque reduction amount is subtracted from the driving torque that is required in order to operate the vehicle 1, and the driving torque output by the engine 2 is calculated, and controls the operation of the engine 2 so that the driving torque calculated by these driving torque reduction calculations is output. Thus, the engine control part 28 reduces the output of the engine 2 by an amount equal to the driving torque reduction amount, and suppresses acceleration slip by applying the slip suppressing torque required in order to suppress slip of the wheels to the vehicle 1. In regard to the driving torque reduction amount, the engine control part 28 calculates the driving torque reduction amount in accordance with the difference between the wheel speed of the drive wheels showing acceleration slip and the traction control target speed, so that the wheel speed of the drive wheels showing acceleration slip is the traction control target speed.

The engine control part 28 compares the vehicle speed and the wheel speed according to the wheel speed sensors 7, and in cases where the acceleration slip rate of the drive wheels is greater than the value set for acceleration slip, the engine control part 28 judges that the drive wheels are undergoing acceleration slip, and performs traction control. The engine control part 28 compares the vehicle speed and the wheel speed according to the wheel speed sensors 7, and in cases where the acceleration slip rate of the drive wheels is smaller than the set value for ending traction control, the engine control part 28 ends traction control.

<Automatic Operation Control>

The automatic operation control that automatically operates the vehicle 1 will be described.

For example, the vehicle 1 can be automatically operated by causing the electronic control unit 5 to perform automatic operation control such as cruise control in which the vehicle is operated while being maintained at a set vehicle speed even if the operator performs no accelerator operation, ACC control in which the vehicle is operated while the inter-vehicle distance between the vehicle and any preceding vehicle is maintained at a fixed distance even if the operator performs no accelerator operation and no braking operation, or the like.

Figure 4:
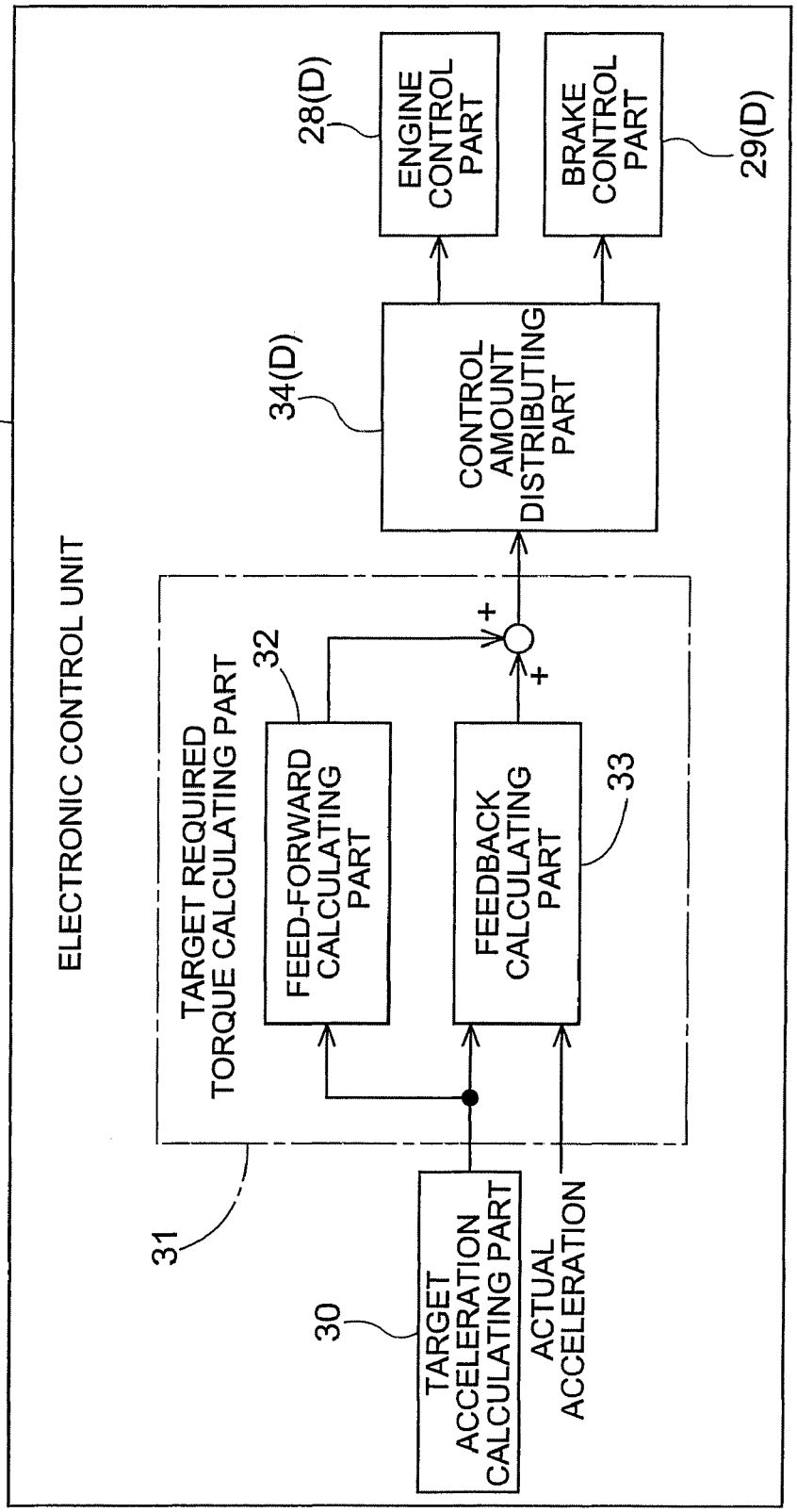
FIG. 4 is a detailed block diagram of an electronic control unit.

As is shown in FIG. 4, the electronic control unit 5 comprises a target acceleration calculating part 30, a target required torque calculating part 31, and a control amount distributing part 34 in order to perform automatic operation control.

In cruise control, the target acceleration calculating part 30 determines the target acceleration on the basis of the difference between the current vehicle speed and a set vehicle speed so that the set vehicle speed is maintained. In regard to the vehicle speed, for example, the mean speed of the wheel speeds respectively detected by the four wheel speed sensors 7 is determined as the vehicle speed.

In ACC control, the target acceleration calculating part 30 determines the target acceleration on the basis of the inter-vehicle distance to the preceding vehicle, the relative speed with respect to the preceding vehicle, and the like, so that the inter-vehicle distance to the preceding vehicle is maintained at a fixed distance. In regard to the inter-vehicle distance to the preceding vehicle, this distance can be determined from the detection signal of the radar sensor R. The relative speed with respect to the preceding vehicle can be determined by differentiating the inter-vehicle distance to the preceding vehicle over time.

The target required torque calculating part 31 comprises a feedback calculating part 33 which performs feedback calculations that determine the target required torque on the basis of the deviation between the target acceleration and actual acceleration, and a feed-forward calculating part 32 which performs feed-forward calculations that determine the target required torque in accordance with the target acceleration. The automatic operation control part D is constructed from the control amount distributing part 34, engine control part 28, and brake control part 29.

The target acceleration calculating part 30 determines the target acceleration used for automatic operation, and outputs this to the target required torque calculating part 31. The target required torque calculating part 31 determines the target required torque from the respective calculated values of the feedback calculated value determined by the feedback calculating part 33, and the feed-forward calculated value determined by the feed-forward calculating part 32, and outputs the determined target required torque to the control amount distributing part 34. On the basis of the target required torque, the control amount distributing part 34 distributes and outputs this as the target required driving torque that is applied to the engine control part 28, and the target required braking torque that is applied to the brake control part 29. For example, when the vehicle 1 is accelerated, the control amount distributing part 34 outputs a target required driving torque corresponding to the target required torque to the engine control part 28. Furthermore, for example, when the vehicle 1 is decelerated, the control amount distributing part 34 distributes the target required torque as a target required driving torque and target required braking torque, and outputs these respectively to the engine control part 28 and brake control part 29.

Thus, during automatic operation control, the target required torque is repeatedly applied to the vehicle 1 in real time, thus controlling the operation of the engine 2 so that the target required driving torque is output, or controlling the operation of the hydraulic braking device 6 so that the target required braking torque is applied to the wheels, thus causing automatic operation of the vehicle 1.

During this automatic operation, the brake control part 29 performs ABS control if it is judged that there is deceleration slip of the wheels, and the engine control part 28 performs traction control if it is judged that there is acceleration slip of the drive wheels. Thus, ABS control or traction control is performed as slip suppression control.

In ABS control or traction control, a slip suppressing torque used to suppress slip of the wheels is applied to the vehicle 1. In this case, a slip suppressing torque is preferentially applied to the vehicle over the target required torque in order to suppress slip of the wheels even in cases where automatic operation is being performed. For example, in the fluid pressure circuit 10 of the hydraulic braking device 2, the disposition locations of the first ordinarily-open control valves 15 or second ordinarily-open control valves 17, and of the first ordinarily-closed control valves 20 or second ordinarily-closed control valves 21, are disposed closer to the wheel cylinders 9 than the fluid pressure pumps 22 and linear control valves 11. Thus, the slip suppressing torque is preferentially applied to the wheel cylinders 9 over the target required torque.

In cases where the target required torque calculating part 31 has performed slip suppression control comprising ABS control or traction control, the feedback calculated value calculated by the feedback calculating part 33 is held, and the target required torque is determined from the respective calculated values of the held feedback calculated value and feed-forward calculated value calculated by the feed-forward calculating part 32. In other words, during the performance of slip suppression control, the target required torque calculating part 31 determines the total value of the held feedback calculated value and feed-forward calculated value as the target required torque.

When slip suppression control is completed, the target required torque calculating part 31 restarts the feedback calculations on the basis of the held feedback calculated value. In other words, at the point in time at which the slip suppression control is completed, the target required torque calculating part 31 determines the total value of the held feedback calculated value and the feed-forward calculated value as the target required torque, and subsequently determines the total value of the feedback calculated value obtained by the restarted feedback calculations and the feed-forward calculated value as the target required torque.

Figure 5:
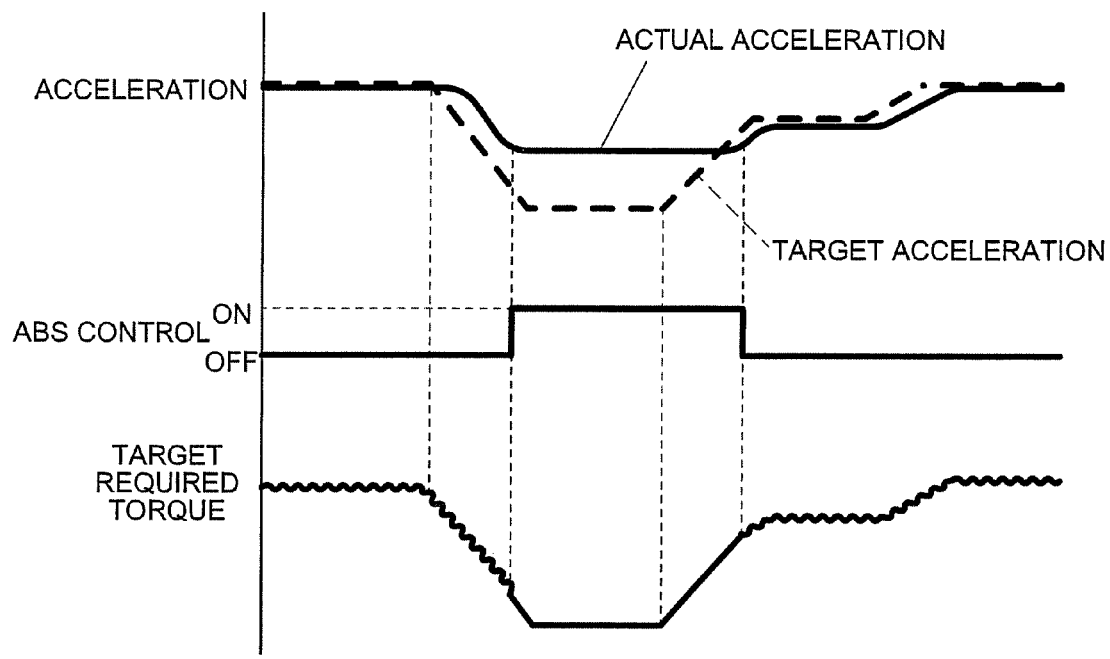
FIG. 5 is a timing chart showing the acceleration, ABS control ON/OFF, and target required torque when ABS control is performed during deceleration in automatic operation.

FIG. 5 shows the target acceleration, actual acceleration, ABS control ON/OFF, and target required torque in a case where ABS control is performed during deceleration in automatic operation.

Until ABS control is performed, the total value of the feedback calculated value determined by the feedback calculating part 33 and the feed-forward calculated value determined by the feed-forward calculating part 32 is applied to the vehicle 1 as the target required torque. When ABS control is performed, the slip suppressing torque is applied to the vehicle 1 preferentially over the target required torque. In this case, the target required torque calculating part 31 holds the feedback calculated value, and determines the target required torque from the respective calculated values of the held feedback calculated value and feed-forward calculated value, so that the target required torque is varied in accordance with the target acceleration. Accordingly, as the target acceleration decreases, the target required torque also decreases. As a result, the torque that is actually applied to the vehicle 1 is reduced to a value that does not cause deceleration slip, and ABS control can be quickly completed. Furthermore, when the ABS control is completed, a target required torque that is varied in accordance with the target acceleration can be applied to the vehicle 1. Accordingly, when the ABS control is completed, the deviation between the actual acceleration and target acceleration can be reduced, and the actual acceleration can track the target acceleration in a short time.

For example, the target required torque can be determined as follows:

The feedback calculating part 33 determines the respective terms in PID calculations using the following Equation 1, and determines the feedback calculated value using the following Equation 2.

$$P(n) = a1 - a2$$

$$I(n) = I(n-1) + P(n) \times \Delta t$$

$$D(n) = (P(n) - P(n-1))/\Delta t \qquad \text{[Equation 1]}$$

Here, P(n) is a proportionality term, a1 is the target acceleration, a2 is the actual acceleration, I(n) is an integrated term, $\Delta t$ is the time elapsed from the nth time to the n+1$^{st}$ time, and D(n) is a differentiated term.

$$T1 = Kp \times P(n) + Ki \times I(n) + Kd \times D(n) \qquad \text{[Equation 2]}$$

Here, T1 is the torque determined as the feedback calculated value, Kp is the proportional gain, Ki is the integrated gain, and Kd is the differentiated gain.

The feed-forward calculating part 32 determines the feed-forward calculated value using the following Equation 3.

$$T2 = (M \times a1) \times r \quad \text{[Equation 3]}$$

Here, T2 is the torque determined as the feed-forward calculated value, M is the weight of the vehicle, a1 is the target acceleration, and r is the wheel diameter.

Figure 6:
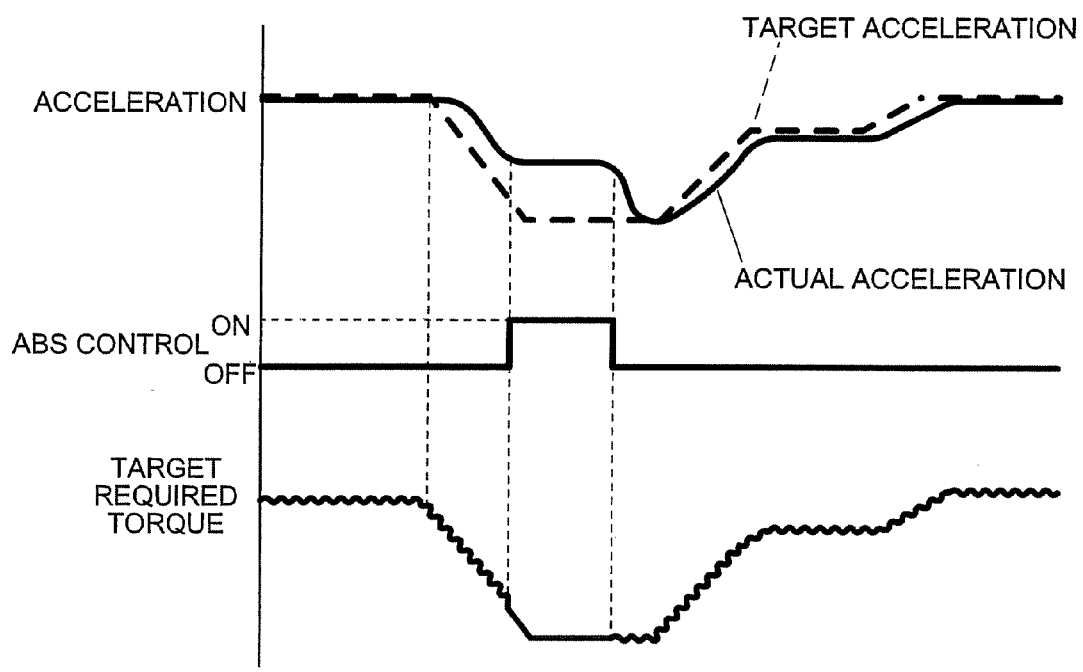
FIG. 6 is a timing chart showing the acceleration, ABS control ON/OFF, and target required torque when ABS control is performed during deceleration in automatic operation.

In FIG. 5, a case was shown in which ABS control was completed as a result of the target required torque varying in accordance with the target acceleration. On the other hand, for example, FIG. 6 shows a case in which ABS control is completed as a result of the coefficient of friction of the road surface varying. Like FIG. 5, FIG. 6 shows the target acceleration, actual acceleration, ABS control ON/OFF, and target required torque.

In this case as well, during the performance of ABS control, the target required torque is determined from the respective calculated values of the held feedback calculated value and feed-forward calculated value, and the target required torque is varied in accordance with the target acceleration. Accordingly, when the ABS control is completed, the target required torque varied in accordance with the target acceleration can be applied to the vehicle 1; consequently, the deviation between the actual acceleration and target acceleration can be reduced, and the actual acceleration can track the target acceleration in a short time.

In FIGS. 5 and 6, a case was indicated in which ABS control was performed during deceleration in automatic operation; in FIG. 7, however, a case is indicated in which traction control is performed during acceleration in automatic operation. Like FIG. 5, FIG. 7 also shows the target acceleration, actual acceleration, traction control ON/OFF, and target required torque.

When traction control is performed, the target required torque calculating part 31 calculates the target required torque from the respective calculated values of the held feedback calculated value and feed-forward calculated value. As the target acceleration decreases, the target required torque also decreases; as a result, the torque that is actually applied to the vehicle is reduced to a value that does not cause acceleration slip, and traction control can be quickly completed. When traction control is completed, the target required torque determined from the respective calculated values of the held feedback calculated value and feed-forward calculated value can be applied to the vehicle 1. Thus, the actual acceleration can track the target acceleration in a favorable manner, and stable automatic operation of the vehicle can be accomplished, not only when AB S control is performed, but also when traction control is performed.

The operation performed in the target required torque calculating part 31 in automatic operation control will be described with reference to the flow chart in FIG. 8. In automatic operation control, an operation in which the target acceleration is determined by the target acceleration calculating part 30, and the operation in the target required torque calculating part 31 shown in the flow chart in FIG. 8, are repeated at a set period.

The feed-forward calculating part 32 determines the feed-forward calculated value by feed-forward calculations (#1). The target required torque calculating part 31 judges the state of the vehicle, and if the feedback hold request is OFF according to this judgment of the vehicle state, the feedback calculating part 33 determines the feedback calculated value by feedback calculations (#2 to 4). If the feedback hold request is ON according to the judgment of the vehicle state, the feedback calculating part 33 sets the proportionality term and differentiated term at zero in the feedback calculations, sets the integrated term at the value of the previous time, and performs feedback holding that holds the feedback calculated value (#5). The target required torque calculating part 31 determines the total value of the feed-forward calculated value and feedback calculated value as the target required torque (#6). In this case, when feedback calculations are performed in #4, the total value of the feedback calculated value according to the feedback calculations and the feed-forward calculated value is taken as the target required torque. When feedback holding is performed in #5, the total value of the held feedback calculated value and feed-forward calculated value is taken as the target required torque.

Figure 9:
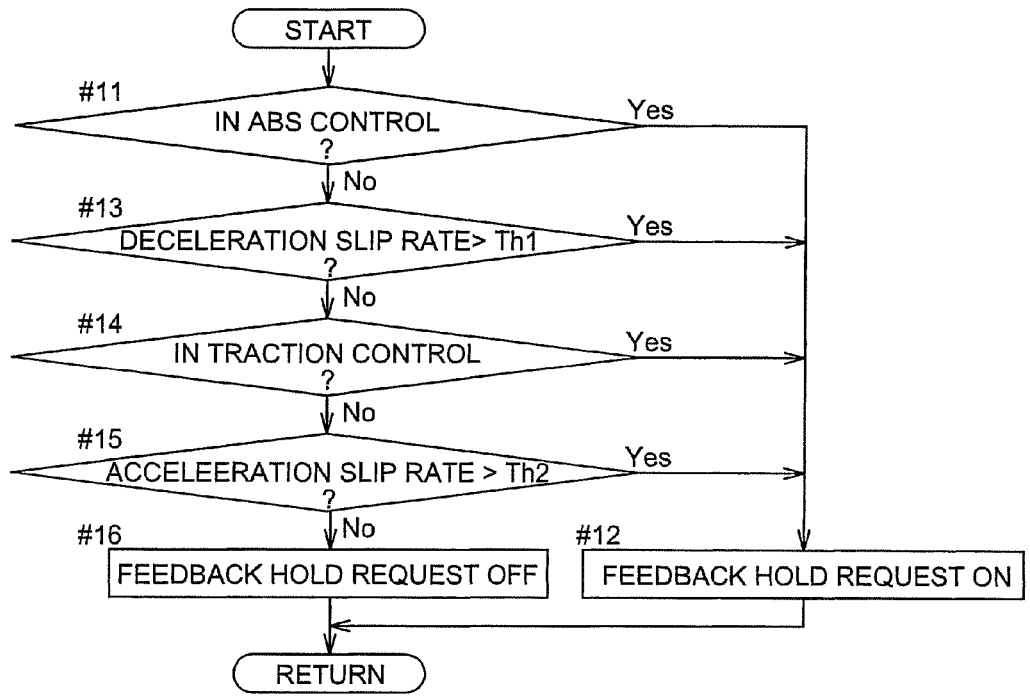
FIG. 9 is a flow chart showing the operation in the judgment of the vehicle state.
Figure 10:
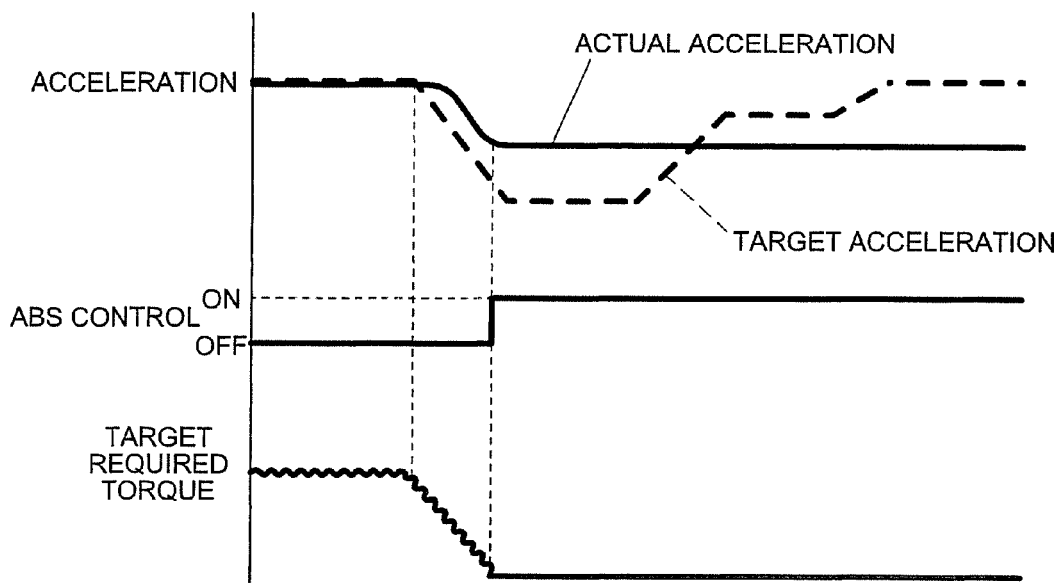
FIG. 10 is a timing chart showing the acceleration, ABS control ON/OFF, and target required torque when ABS control is performed during deceleration in automatic operation in a conventional vehicle automatic operation control device.

The ON/OFF of the feedback holding request according to the judgment of the vehicle state will be described with reference to the flow chart shown in FIG. 9.

If ABS control is in operation, or if the deceleration slip rate exceeds the set value Th1 for deceleration slip, the target required torque calculating part 31 switches the feedback holding request ON (#11 to 13). If the deceleration slip rate exceeds the set value Th1 for deceleration slip, ABS control is performed; accordingly, when the deceleration slip rate is greater than the set value Th1 for deceleration slip, the performing of ABS control is currently being attempted.

If traction control is in operation, or if the acceleration slip rate exceeds the set value Th2 for acceleration slip, the target required torque calculating part 31 switches the feedback holding request ON (#14, 15, 12). If the acceleration slip rate exceeds the set value Th2 for acceleration slip, traction control is performed; accordingly, when the acceleration slip rate is greater than the set value Th2 for acceleration slip, the performing traction control is currently being attempted.

If ABS control is not in operation or the deceleration slip rate is less than the set value for deceleration slipping, or if traction control is not in operation or the acceleration slip rate is less than the set value for acceleration slipping, the target required torque calculating part 31 switches the feedback holding request OFF (#16).

Other Embodiments (1) In the embodiment described above, the target required torque can be determined so that the actual acceleration is an acceleration obtained by multiplying the target acceleration by a coefficient. Furthermore, if the target required torque determined from the respective calculated values of the feed-forward calculated value and feedback calculated value is equal to or less than a set value, the determined target required torque is directly taken as the target required torque, while if the target required torque determined from the respective calculated values of the feed-forward calculated value and feedback calculated value exceeds the set value, the set value is taken as the target required torque.

(2) In the embodiment described above, the system is devised so that both ABS control and traction control are performed as slip suppression control. However, it would also be possible to perform only ABS control or traction control as slip suppression control.

(3) In the embodiment described above, for example, the fluid pressure circuit 10 can also be constructed so that the master cylinder fluid pressure is applied to wheel cylinders 9FR and 9RL disposed on the right front wheel FR and left rear wheel RL by the first fluid pressure circuit 10a, and the master cylinder fluid pressure is applied to wheel cylinders 9FL and 9RR disposed on the left front wheel FL and right rear wheel RR by the second fluid pressure circuit 10b. In other words, the construction whereby the master cylinder fluid pressure is applied to the wheel cylinders by the fluid pressure circuit 10 can be appropriately altered.

INDUSTRIAL APPLICABILITY

The present invention comprises a target required torque calculating part which determines a target required torque from each calculated value according to a feed-forward calculated value and a feedback calculated value, and an automatic operation control part which automatically operates the vehicle on the basis of this determined target required torque. The invention can be applied to various types of vehicle automatic operation control devices which are devised so that in cases where slip suppression control that suppresses slip of the wheels when any of the wheels of the vehicle slips is performed by the automatic operation control part, the target required torque calculating part can automatically operate the vehicle while the actual acceleration tracks the target acceleration in a favorable manner.

What is claimed is:

1. A vehicle automatic operation control device comprising:
   a target required torque calculating part for determining a target required torque from each calculated value according to a feed-forward calculated value based on a target acceleration and a feedback calculated value based on a deviation between the target acceleration and an actual acceleration; and
   an automatic operation control part for causing automatic operation of a vehicle on the basis of the determined target required torque, and performing slip suppression control for suppressing slip of a vehicle wheel in cases where any of the wheels of the vehicle slips; wherein
   in a case where slip suppression control is performed by the automatic operation control part, the target required torque calculating part holds the feedback calculated value based on the deviation between the target acceleration and the actual acceleration, and determines the target required torque from each of the calculated values according to the held feedback calculated value and the feed-forward calculated value.

2. The vehicle automatic operation control device according to claim 1, wherein the automatic operation control part suppresses wheel slip during deceleration of the vehicle as the slip suppression control; and the target required torque calculating part determines braking torque applied to the wheels as the target required torque.

3. The vehicle automatic operation control device according to claim 2, wherein when the slip suppression control performed by the automatic operation control part has concluded, the target required torque calculating part restarts feedback calculations on the basis of the held feedback calculated value.

4. The vehicle automatic operation control device according to claim 1, wherein the automatic operation control part suppresses the slip of drive wheels during acceleration of the vehicle as the slip suppression control; and the target required torque calculating part determines drive torque applied to the drive wheels as the target required torque.

5. The vehicle automatic operation control part according to claim 4, wherein when the slip suppression control performed by the automatic operation control part has concluded, the target required torque calculating part restarts feedback calculations on the basis of the held feedback calculated value.

6. The vehicle automatic operation control device according to claim 1, wherein when the slip suppression control performed by the automatic operation control part has concluded, the target required torque calculating part restarts feedback calculations on the basis of the held feedback calculated value.

* * * * *